United States Patent [19]

Kamizyo et al.

[11] Patent Number: 4,485,408
[45] Date of Patent: Nov. 27, 1984

[54] HALFTONE PROCESSING METHOD FOR DIGITAL FACSMILE APPARATUS

[75] Inventors: Eiji Kamizyo; Noboru Murayama, both of Tokyo, Japan

[73] Assignee: Ricoh Company, Ltd., Tokyo, Japan

[21] Appl. No.: 395,779

[22] Filed: Jul. 7, 1982

[30] Foreign Application Priority Data

Jul. 11, 1981 [JP] Japan .................... 56-107583

[51] Int. Cl.³ .................................. H04N 1/40
[52] U.S. Cl. ............................ 358/283; 358/280
[58] Field of Search ................ 358/280, 283, 298

[56] References Cited

U.S. PATENT DOCUMENTS

3,393,269 7/1968 Zeuthen ..................... 358/298
4,414,581 11/1983 Kato ......................... 358/283

Primary Examiner—Howard W. Britton
Attorney, Agent, or Firm—David G. Alexander

[57] ABSTRACT

A halftone processing method for a digital facsimile apparatus utilizing the dither method is disclosed which permits a threshold level to be changed at every desired number of picture elements in the horizontal scan direction. The change of the threshold level may occur selectively at every other picture element, every two picture elements every three picture elements and every four picture elements.

6 Claims, 11 Drawing Figures

HALFTONE PROCESSING METHOD FOR DIGITAL FACSMILE APPARATUS

BACKGROUND OF THE INVENTION

The present invention relates to an image signal processing method for a high speed digital facsimile apparatus and, more particularly, to a halftone processing method which allows a receiver to clearly reproduce in binary picture elements, i.e., black and white, those images of middle tones or halftones sent thereto from a transmitter.

A typical method for the reproduction of halftone images in black and white picture elements is the dither method. In this method, the density level $S(i,j)$ of each picture element $(i,j)$ constituting a halftone image is compared with a corresponding threshold component $T_D(k,l)$ of a threshold matrix (dither matrix) $T_D$, which has $M \times N$ threshold components. If the density level $S(i,j)$ is larger than or equal to the threshold component $T_D(k, l)$, the picture element will have (logical) "1" or black density level when reproduced; if not, then (logical) "0" or white density level.

The dither method is applicable to a high speed digital facsimile apparatus to reproduce at a receiver a halftone image transmitted thereto. Usually, for such an application, sixteen successive density levels are predetermined from the white level to the black level, i.e. threshold levels or slice levels "0" to "15". A plurality of threshold levels are selected out of the predetermined sixteen threshold levels at random and arranged in the horizontal and vertical scan directions to form a threshold pattern, which corresponds to the dither matrix. A CCD image sensor of a scanner produces an analog signal whose density levels correspond to individual picture elements are compared with the threshold levels in the threshold pattern in one to one correspondence, whereby each of the picture elements in the analog signal is sorted into the black or white level. This method can effectively reproduce a halftone image which resembles one on a document transmitted, because the picture elements share as many as sixteen successive threshold levels.

As described above, the density levels of the picture elements are compared with the threshold levels in one to one relation. In otherwords, the threshold level differs from one picture element to another at least in the horizontal scan direction; the threshold level is changed for every other picture element. This brings about a problem, however. When the resulting binary signal is coded by the ordinary modified Huffman system to be transmitted, the black or white run lengths will become shortened unless the halftone is extremely close to black or white. The shorter run lengths would degrade the coding efficiency and, thereby, increase the time period necessary for transmission.

SUMMARY OF THE INVENTION

In accordance with the present invention, a halftone processing method for a digital facsimile apparatus utilizing the dither method permits a threshold level to be changed at every desired number of picture elements in the horizontal scan direction. The change of the threshold level may occur selectively at every other picture element, every two picture elements, every three picture elements and every four picture elements.

It is an object of the present invention to provide a new halftone processing method which shortens the time period necessary for the transmission of images in a digital facsimile apparatus at a transmitter, while ensuring reproduction of desirable halftone images at a receiver.

It is another object of the present invention to provide a generally improved halftone image processing method for a digital facsimile apparatus.

Other objects, together with the foregoing, are attained in the embodiments described in the following description and illustrated in the accompanying drawings.

DESCRIPTION OF THE PREFERRED EMBODIMENTS

While the halftone processing method for a digital facsimile apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
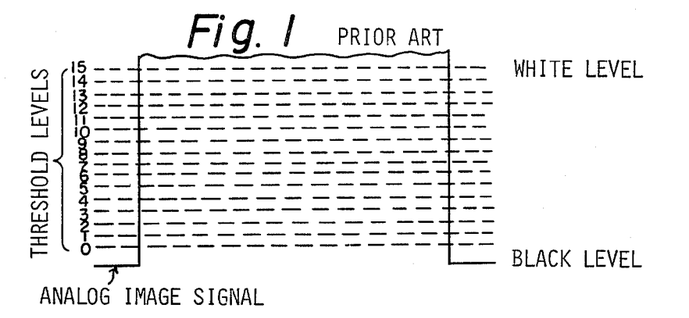
FIG. 1 is a diagram showing threshold levels generally employed for the dither method which is known in the art as a method of processing halftone images in a digital facsimile apparatus.
Figure 2:
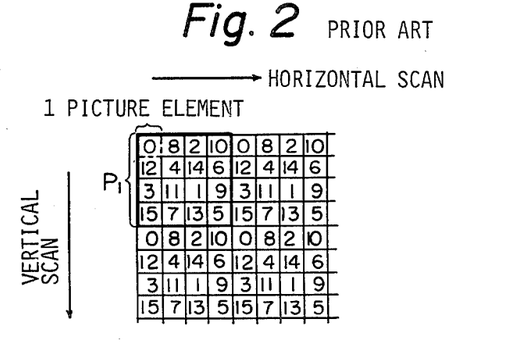
FIG. 2 shows an exemplary threshold matrix or dither matrix heretofore employed for the dither method.

Referring to FIGS. 1 and 2, there is shown an example of a method which allows a halftone image to be reproduced in a conventional digital facsimile apparatus, i.e. dither method. As seen in FIG. 1, sixteen successive threshold levels or slice levels "0" to "15" are predetermined from the black level to the white level. Meanwhile, as shown in FIG. 2, a threshold pattern $P_1$ is prepared which is made up of four different threshold levels in each of the horizontal and vertical scan directions, that is, sixteen threshold levels in total. In detail, the threshold pattern $P_1$ has in its first row four different threshold levels "0", "8", "2" and "10" selected at random out of the sixteen threshold levels, in its second row four different threshold levels "12", "4", "14" and "6", in its third row four different threshold levels "3", "11", "1" and "9", and in its fourth row four different threshold levels "15", "7", "13" and "5". An analog image signal from a CCD image sensor of a scanner represents density levels of the respective picture elements. These density levels are compared in one to one relation with the respective threshold levels of the threshold pattern and, thereby, converted into binary levels. Such a procedure is repeated in the horizontal and vertical scan directions until the entire image pattern is processed into the black and white levels.

Thus, the threshold pattern employed for the conventional method has a threshold level which is changed at every other picture element at least in the horizontal direction, that is, the threshold level is switched from one to another for each picture element. This brings about a problem, however. If an image pattern processed with such a threshold pattern were coded by the ordinary modified Huffman system and transmitted to a receiver, the black or white run-length would become shorter except for halftones which are quite close to black or white. The result would be a poor coding efficiency which prolongs the transmission time.

Figure 6:
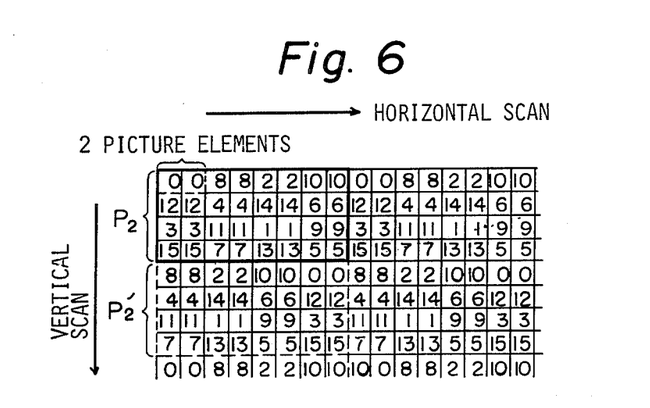
FIGS. 6 and 7 show other threshold patterns applicable to the present invention.
Figure 7:
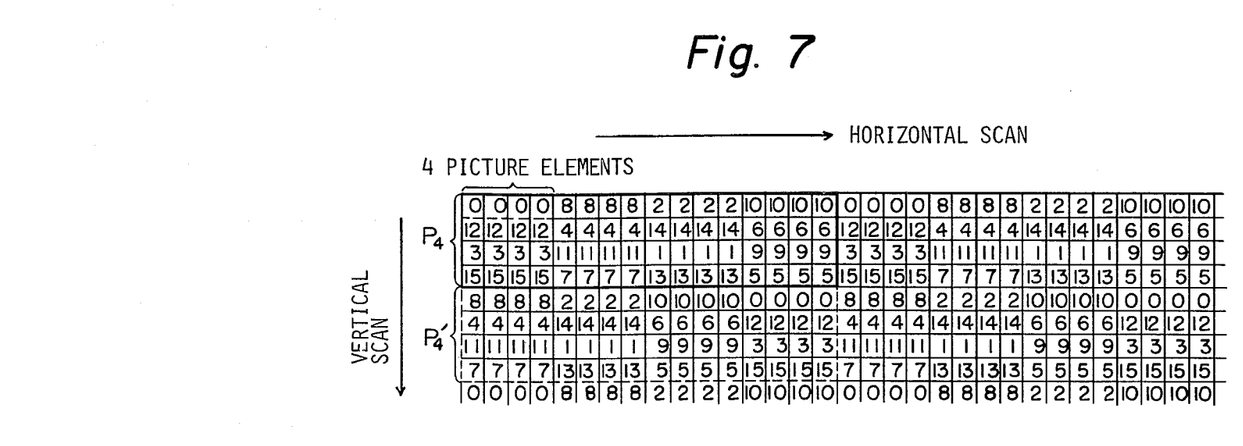

To overcome this problem, the present invention contemplates to process an image pattern using a unique arrangement of threshold pattern such as shown in FIGS. 6 or 7. In accordance with the present invention, the threshold pattern has two, three or even four common threshold levels arranged in succession in the horizontal scan direction. Stated another way, the threshold level is changed from one to another at least at every two picture elements in the horizontal scan direction.

Figure 3:
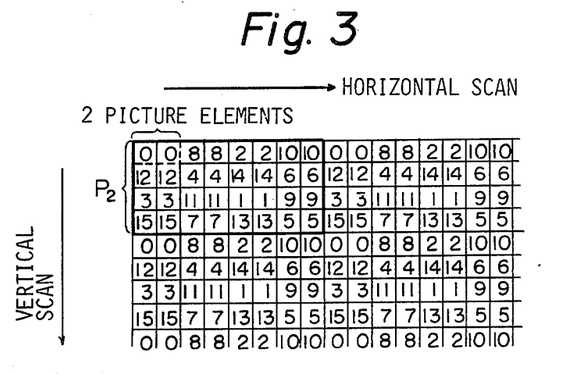
FIGS. 3 and 4 show different threshold patterns applicable to a halftone processing method embodying the present invention.
Figure 4:
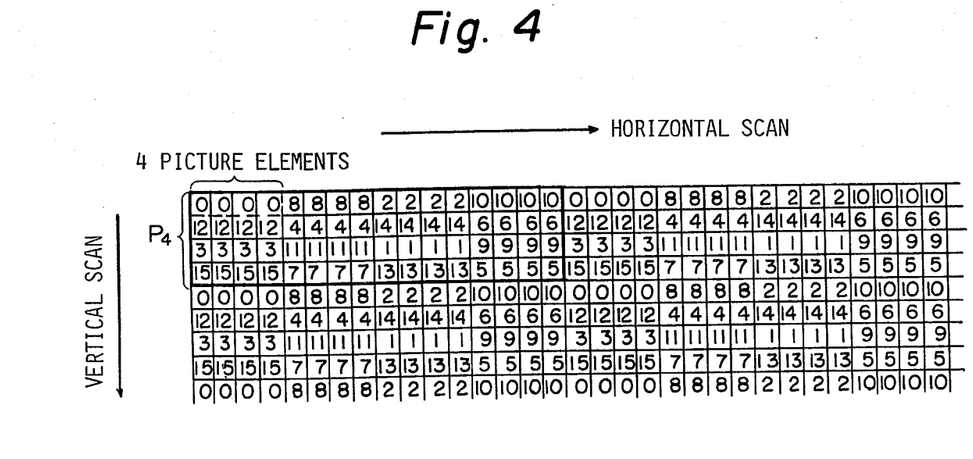
Figure 5:
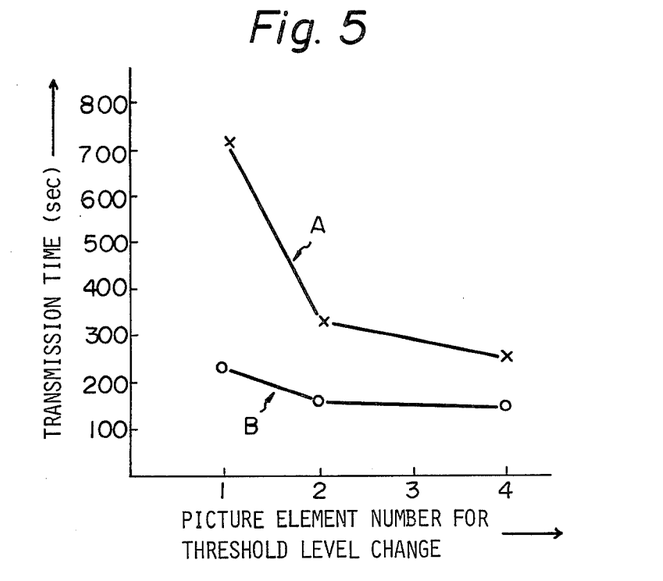
FIG. 5 shows a relationship between the number of successive picture elements to which the same threshold level is alloted and the time period necessary for transmission.

We carried out tests to determine an actual transmission time and an actual density of reproduced image for each of the conventional threshold pattern $P_1$ in which a different threshold level appears at every other picture element in the horizontal direction, a threshold pattern $P_2$ shown in FIG. 3 in which the threshold level is changed from one to another at every two picture elements, and a threshold pattern $P_4$ shown in FIG. 4 in which the threshold level is changed at every four picture elements. The tests resulted curves A and B indicated in FIG. 5 concerning the transmission time. In FIG. 5, curve A represents an image pattern in the form of a picture only and curve B an image pattern which includes both a picture and a character. It will be seen from these curves that the transmission time can be noticeably shortened by changing the threshold level at least at every third picture element in the horizontal scan direction. As for the density of reproduced halftone image, it was found that a halftone image sufficiently acceptable in practice can be attained even when the threshold level is changed at every fifth picture element, though the image quality progressively lowers as the number of successive picture elements in which the same threshold level appears is increased.

Furthermore, tests were carried out using a combined threshold pattern shown in FIG. 6 which is a mixture of the pattern $P_2$ and a pattern prepared by shifting the pattern $P_2$ two bits in the horizontal scan direction, and a mixture of the pattern $P_4$ and a pattern which is a four-bit shifted version of the pattern $P_4$. The tests showed that the resulting halftone images are superior in quality to those of the case shown in FIGS. 3 or 4.

Thus, it was revealed that the time period required for transmission can be shortened if the threshold level is changed at every third picture element.

Figure 8:
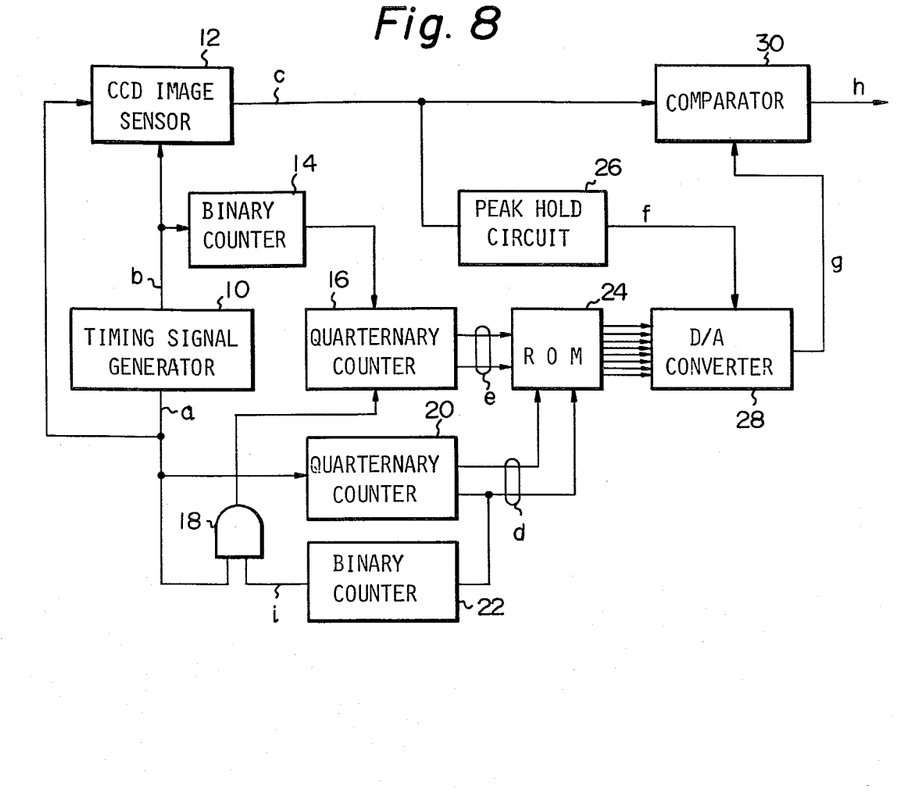
FIG. 8 is a block diagram of an image signal processing circuit for practicing the method of the present invention.
Figures 9, 9A:
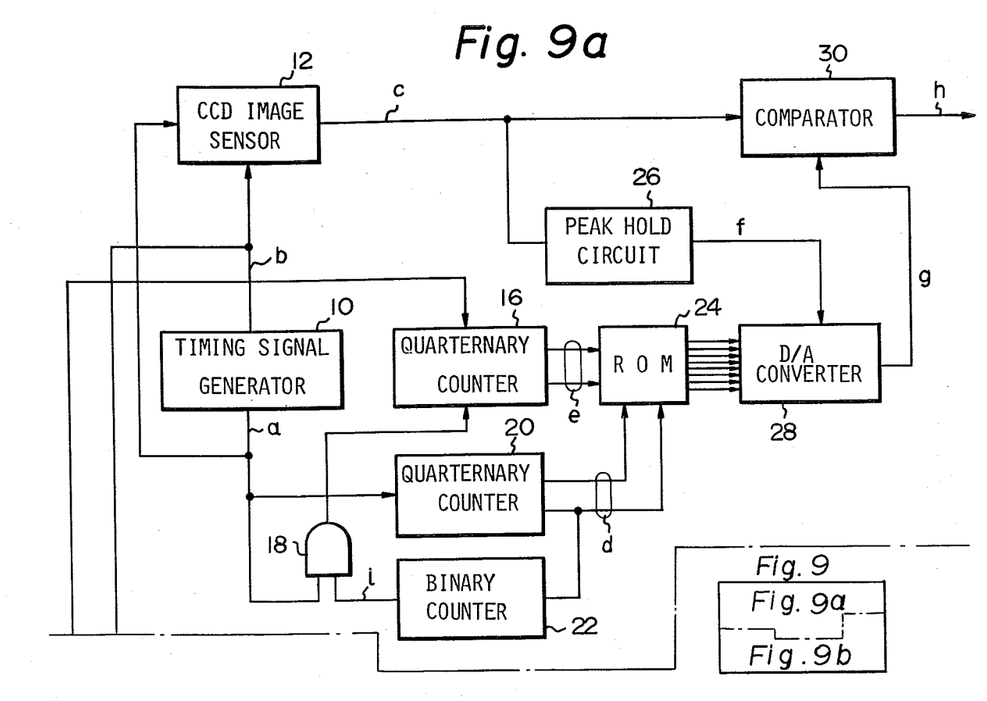
FIGS. 9, 9a and 9b are a block diagram of an alternative image signal processing circuit for practicing the method of the present invention.
Figure 9B:
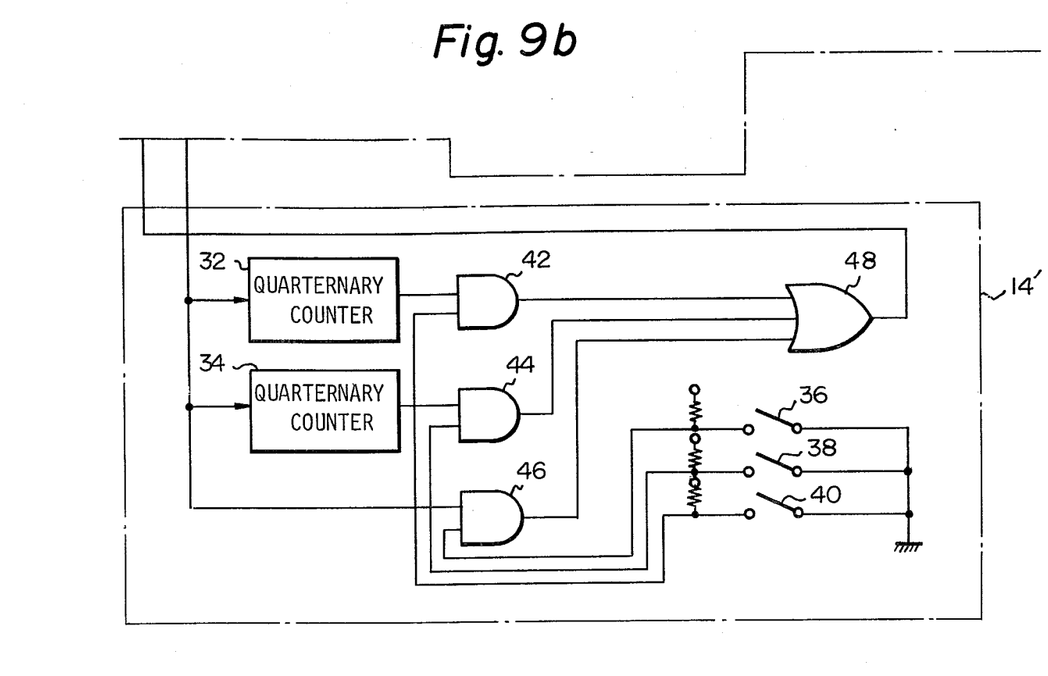
Figure 10:
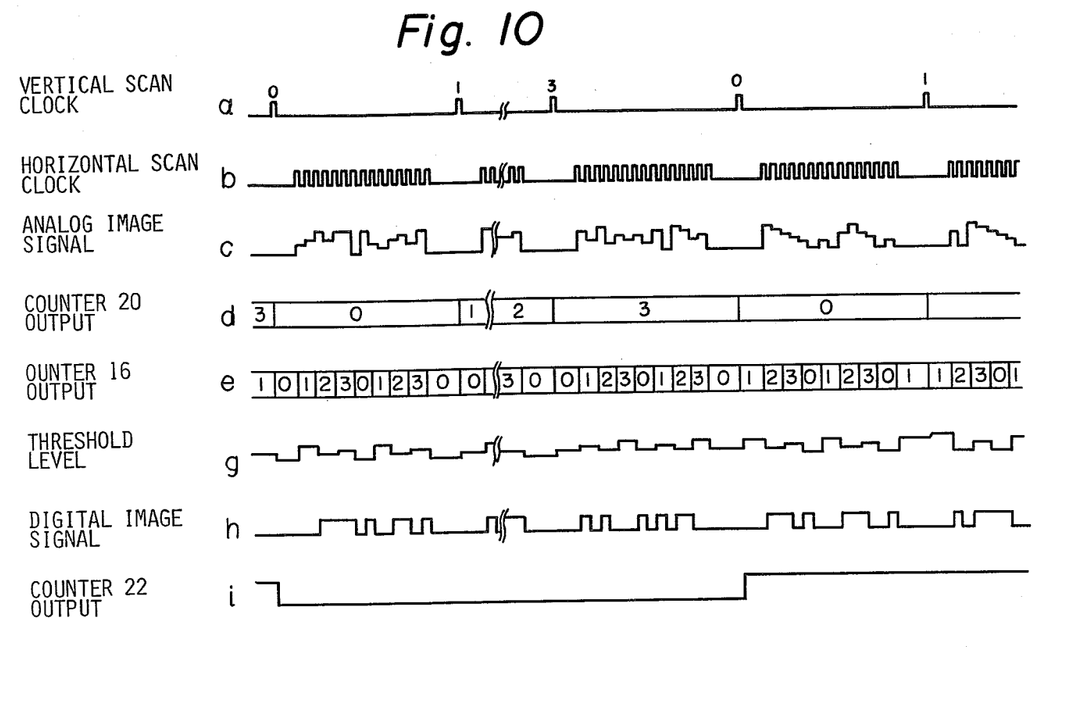
FIG. 10 is a timing chart demonstrating the operation of the circuit shown in FIGS. 8 or 9.

Referring now to FIGS. 8 to 10, a practical circuit arrangement for carrying out the method of the present invention which is based on the above findings will be described.

FIG. 8 shows an image signal processing circuit installed in a digital facsimile apparatus at a transmitter and designed to use the threshold pattern shown in FIG. 6. The circuit includes a timing signal generator 10 adapted to generate vertical scan clock pulses a and horizontal scan clock pulses b. A CCD image sensor 12 outputs an analog image signals or image pattern c to be transmitted, in synchronism with the horizontal scan clock pulses b. A binary counter divides the frequency of the horizontal clock pulses b to ½. A quarternary counter 16 counts outputs of the binary counter 14 and those of an AND gate 18. A second quarternary counter 20 counts the vertical scan clock pulses a. A second binary counter 22 divides the frequency of the vertical scan clock pulses a to ¼. A read only memory or ROM 24 stores digital data which indicate sixteen threshold levels. A peak hold circuit 26 functions to hold a peak value of each analog signal c. A digital-to-analog or D/A converter 28 converts digital data from the read only memory 24 into a threshold level which corresponds to the peak value of the analog signal c. A comparator 30 compares the analog signal c with the threshold level to transform it into a binary level.

As a scanning unit starts its operation for reading a desired document, the timing signal generator 10 delivers one vertical scan clock pulse a for each horizontal scan line and one horizontal scan clock pulse b for each picture element, as shown in the timing chart of FIG. 10. In response to a horizontal scan clock pulse b, the CCD image sensor 12 outputs an analog image signal c whose level is proportional to an amount of light directed from the document then. The quarternary counter 20 counts the vertical scan clock pulses a and supplies its output d to the read only memory 24. At the same time, the counter 20 counts the horizontal scan clock pulses b at every other bit and couples its output e also to the read only memory 24. Addressed by these inputs d and e, the read only memory 24 selects specific one of sixteen different data stored therein and supplies it to the digita-to-analog converter 28. As a result, the read only memory 24 sequentially selects and delivers a set of four different data each at every third picture element, the data set differing from one line to the next. The digital-to-analog converter 28 processes the input data into threshold levels g which correspond to peak values f which are coupled thereto from the peak hold circuit 26. The comparator 30 supplied with the threshold levels g compare them with the analog image signals c delivered from the CCD image sensor 12. The resulting binary levels are fed as digital image signals h to a coding unit (not shown).

Thus, the initial four lines of analog signal from the CCD image sensor 12 are processed by the repetition of the 8×4 threshold pattern $P_2$ of FIG. 6, in which the threshold level is changed at every third picture element. For the next four lines of analog signal, which are processed in the same way into binary levels, the output i of the binary counter 22 becomes "1" level so that the AND gate 18 connected therewith is opened. The AND gate 18 therefore passes a vertical scan clock pulse a from the timing signal generator 10 to the quarternary counter 16 therethrough, thereby incrementing the counter 16 by "1" before an output of the binary counter 14 reaches it. Accordingly, the four lines of analog signal concerned are transformed into binary levels based on the threshold pattern $P_2'$ which is a two-bit shifted version of the previous threshold pattern $P_2$.

When the binary digital image signals h are coded and transmitted to a receiver, the halftone image reproduced at the receiver is comparable in quality with one provided by the prior art method. In addition, as shown in FIG. 5, the time period necessary for transmission can be substantially halved compared to the prior art method, in case where the document is in the form of a picture including halftone areas.

If the circuitry shown in FIG. 8 has its AND gate 18 omitted, it will process the analog image signal c with the threshold pattern $P_2$ of FIG. 3. Alternatively, if the circuitry includes a quarternary counter instead of the binary counter 14, it will process the analog image signal c with the combined threshold pattern $P_4$, $P_4'$ shown in FIG. 7. Furthermore, if the AND gate 18 is omitted in addition to the replacement of the binary counter 14 by a quarternary counter, the threshold pattern $P_4$ shown in FIG. 4 will be selected for processing the analog image signal c. With the same principle, an arrangement may be made such that one threshold level appears even at every fourth or fifth picture element in the horizontal scan direction.

Meanwhile, it will be seen that the transmission time can be shortened and the quality of halftone image reproduction enhanced, if an arrangement is made to allow the user to select one of a plurality of threshold patterns optimum for the kind of a desired document, i.e., a specific interval for the change of a threshold level.

Reference will be made to FIG. 10 for describing an alternative image processing circuit which permits the threshold level to be changed at every other picture element, every two picture elements or every four picture elements as desired in the horizontal scan direction, to match with a kind of the intended document. In FIG. 10, the same structural elements as those shown in FIG. 8 are designated by the same reference numerals.

As shown, the circuit of FIG. 9 differs from that of FIG. 8 in that the binary counter 14 is replaced by a selector 14' which selects a number of successive picture elements to which the same threshold level is to be allotted. The selector 14' is made up of a quarternary counter 32 for dividing the frequency of the horizontal scan clock pulses b to ¼, a binary counter 34 for dividing the frequency of the horizontal scan clock pulses b, switches 36, 38 and 40 for causing the threshold level to be changed at every other picture element, every two picture elements and every four picture elements, respectively, depending on the kind of a document, AND gates 42, 44 and 46, and an OR gate 48.

Where a change of the threshold level at every two picture elements is suitable for a document, for example, the switch 44 of the selector 14' is operated. As a scanning operation on the document is initiated, the vertical scan clock pulses b are supplied from the timing signal generator 10 to the quarternary counter 16 via the binary counter 34, AND gate 44 and OR gate 48. A procedure which is to follow is common to that described with reference to FIG. 8 and, therefore, will not be described for simplicity. When the switch 40 of the selector 14' is selected to change the threshold level at every four picture elements, the vertical scan clock pulses b from the timing signal generator 10 are fed to the quarternary counter 16 through the quarternary counter 32, AND gate 42 and OR gate 48 upon the start of a scan on the document. Then, the quarternary counter 16 receives one pulse for every four bits of horizontal scan clock so that the analog image signal is processed by the threshold pattern shown in FIG. 7, in which the threshold level is changed at every four picture elements. When the switch 36 of the selector 14' is selected, the analog image signal will be processed by the conventional threshold pattern indicated in FIG. 2, in which the threshold level is changed at every other picture element.

With this arrangement, a change of the threshold level can be freely effected at a desired interval merely by choosing one of the switches 36, 38 and 40. Selecting an optimum interval for the change of the threshold level in accordance with the kind of a document will thus shorten the transmission time and realize high quality reproduction of halftone images.

Though the threshold level has been shown and described as being changed at every other picture element, every two picture elements or every four picture elements, it will be apparent that the interval may be one picture element, two picture elements, three picture elements . . . , if desired.

In summary, it will be seen that the present invention provides a halftone processing method which reduces a time period necessary for image transmission in a facsimile apparatus which uses a modified Huffman type data compression unit.

Various modifications will become possible for those skilled in the art after receiving the teachings of the present disclosure without departing from the scope thereof.

What is claimed is:

1. A method of processing a video image to produce a halftone image, comprising the steps of:
   (a) scanning the video image along horizontal scan lines to detect a density level of each picture element of the video image;
   (b) preparing a first threshold matrix comprising a plurality of different threshold levels or slice levels;
   (c) preparing a second threshold matrix comprising each successive threshold level of the first threshold matrix repeated a predetermined number of times in the horizontal scan direction;
   (d) comparing the detected density levels of the video image with the respective threshold levels of the second threshold matrix in one to one correspondence;
   (e) producing a halftone image by determining each of the picture elements of the halftone image to be black when the density level of the video image is higher than the respective threshold level and white when the density level is lower than the respective threshold level; and
   (f) providing means for selectively varying said predetermined number of times.

2. A method as claimed in claim 1, in which the first threshold matrix prepared in step (b) comprises sixteen different threshold or slice levels.

3. A method as claimed in claim 1, in which said predetermined number of times is selected to be two times.

4. A method as claimed in claim 1, in which said predetermined number of times is selected to be three times.

5. A method as claimed in claim 1, in which said predetermined number of times is selected to be four times.

6. A method as claimed in claim 1, further comprising step (g) of varying the order of the threshold levels of the second threshold matrix on each of the horizontal scan lines to form a third threshold matrix to be used for picture elements on a next set of horizontal scan lines.

* * * * *